(12) United States Patent
Abraham et al.

(10) Patent No.: US 9,742,590 B2
(45) Date of Patent: Aug. 22, 2017

(54) CHANNEL STATE INFORMATION (CSI) FEEDBACK PROTOCOL FOR MULTIUSER MULTIPLE INPUT, MULTIPLE OUTPUT (MU-MIMO)

(75) Inventors: Santosh Paul Abraham, San Diego, CA (US); Simone Merlin, San Diego, CA (US); Hemanth Sampath, San Diego, CA (US); Maarten Menzo Wentink, Naarden (NL); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 13/176,947

(22) Filed: Jul. 6, 2011

(65) Prior Publication Data

US 2012/0176921 A1    Jul. 12, 2012

Related U.S. Application Data

(60) Provisional application No. 61/361,952, filed on Jul. 7, 2010.

(51) Int. Cl.
*H04W 4/00* (2009.01)
*H04L 25/02* (2006.01)
(Continued)

(52) U.S. Cl.
CPC ........ *H04L 25/0226* (2013.01); *H04L 1/0026* (2013.01); *H04L 1/1671* (2013.01);
(Continued)

(58) Field of Classification Search
USPC ................................................ 370/310–349
See application file for complete search history.

(56) References Cited

U.S. PATENT DOCUMENTS 7,933,255 B2   4/2011 Li
8,284,686 B2 * 10/2012 Gu et al. ................ 370/252
(Continued)

FOREIGN PATENT DOCUMENTS

CN       101305525 A   11/2008
EP         2104245 A1    9/2009
(Continued)

OTHER PUBLICATIONS

Liu, Provisional Application No. 61/266067.*
(Continued)

*Primary Examiner* — Kwang B Yao
*Assistant Examiner* — Juvena Loo
(74) *Attorney, Agent, or Firm* — Kevin M. Donnelly

(57) ABSTRACT

Certain aspects of the present disclosure provide techniques and apparatus for using channel state information (CSI) feedback for multiuser multiple-input multiple-output (MU-MIMO) transmission. For certain aspects, a method of wireless communications generally includes generating a training frame and transmitting the generated training frame. The training frame typically includes first information identifying a group of one or more apparatuses and second information indicating whether each of the apparatuses in the group is to determine at least one characteristic of a channel. For other aspects, a method of wireless communications generally includes receiving a request at an apparatus and transmitting, in response to the received request, a packet using frame aggregation, wherein two or more frames are transmitted in a single transmission using a single header.

60 Claims, 10 Drawing Sheets

(51) Int. Cl.
*H04L 1/00* (2006.01)
*H04L 1/16* (2006.01)
*H04L 5/00* (2006.01)
*H04L 25/03* (2006.01)

(52) U.S. Cl.
CPC ........ *H04L 25/0222* (2013.01); *H04L 5/0023* (2013.01); *H04L 5/0048* (2013.01); *H04L 5/0053* (2013.01); *H04L 25/0204* (2013.01); *H04L 25/0228* (2013.01); *H04L 25/03343* (2013.01); *H04L 2025/03426* (2013.01); *H04L 2025/03802* (2013.01)

(56) References Cited

U.S. PATENT DOCUMENTS

| | | | |
|---|---|---|---|
| 8,462,765 B2 | 6/2013 | Abraham et al. | |
| 8,526,351 B2* | 9/2013 | Fischer et al. | 370/312 |
| 8,542,589 B2 | 9/2013 | Surineni et al. | |
| 8,830,846 B2* | 9/2014 | Grandhi | H04L 1/1664 370/232 |
| 2005/0122960 A1 | 6/2005 | Khan et al. | |
| 2005/0147075 A1 | 7/2005 | Terry | |
| 2006/0078001 A1 | 4/2006 | Chandra et al. | |
| 2006/0165191 A1* | 7/2006 | Lin | H04B 7/0417 375/267 |
| 2006/0248429 A1* | 11/2006 | Grandhi | H04L 1/1664 714/749 |
| 2007/0097981 A1 | 5/2007 | Papasakellariou | |
| 2007/0129018 A1* | 6/2007 | Trainin | H04L 1/0026 455/69 |
| 2007/0147284 A1 | 6/2007 | Sammour et al. | |
| 2007/0171933 A1* | 7/2007 | Sammour | H04W 74/0816 370/447 |
| 2007/0195811 A1* | 8/2007 | Basson | H04L 1/0026 370/441 |
| 2007/0201566 A1* | 8/2007 | Solomon | H04B 7/0417 375/260 |
| 2007/0230373 A1 | 10/2007 | Li et al. | |
| 2007/0258384 A1* | 11/2007 | Sammour | H04W 36/24 370/252 |
| 2007/0298742 A1* | 12/2007 | Ketchum | H04B 7/0617 455/186.1 |
| 2008/0014870 A1* | 1/2008 | Kim | H04B 7/0417 455/69 |
| 2008/0045153 A1* | 2/2008 | Surineni | H04B 7/0417 455/63.1 |
| 2008/0080437 A1 | 4/2008 | Krishnaswamy et al. | |
| 2009/0088174 A1 | 4/2009 | Kikuchi et al. | |
| 2009/0207765 A1* | 8/2009 | Yamaura | H04B 7/0417 370/310 |
| 2009/0232109 A1 | 9/2009 | Nandagopalan et al. | |
| 2009/0290563 A1* | 11/2009 | Gu | H04B 7/0608 370/338 |
| 2010/0260138 A1* | 10/2010 | Liu | H04L 5/0023 370/330 |
| 2010/0309834 A1* | 12/2010 | Fischer | H04B 7/0452 370/312 |
| 2011/0069629 A1 | 3/2011 | Breit et al. | |
| 2011/0075607 A1* | 3/2011 | Kim et al. | 370/328 |
| 2011/0128929 A1* | 6/2011 | Liu et al. | 370/329 |
| 2011/0149882 A1* | 6/2011 | Gong | H04L 1/1685 370/329 |

FOREIGN PATENT DOCUMENTS

| | | |
|---|---|---|
| EP | 2239975 A1 | 10/2010 |
| JP | 2006173867 A | 6/2006 |
| JP | 2008538272 A | 10/2008 |
| JP | 2009010628 A | 1/2009 |
| JP | 2009147786 A | 7/2009 |
| JP | 2009526434 A | 7/2009 |
| JP | 2010507978 A | 3/2010 |
| JP | 2010515313 A | 5/2010 |
| JP | 2013521694 A | 6/2013 |
| WO | WO-2006107886 A2 | 10/2006 |
| WO | WO-2007114804 A1 | 10/2007 |
| WO | 2007143472 | 12/2007 |
| WO | 2008051466 A2 | 5/2008 |
| WO | WO-2008069245 A1 | 6/2008 |
| WO | 2008077433 A1 | 7/2008 |
| WO | WO-2009027931 A2 | 3/2009 |
| WO | WO-2009093662 A1 | 7/2009 |
| WO | WO-2010022253 | 2/2010 |
| WO | WO-2010027865 A2 | 3/2010 |
| WO | WO-2011068985 A1 | 6/2011 |
| WO | WO-2011108898 A2 | 9/2011 |

OTHER PUBLICATIONS

Liu, Provisional Application No. 61/303231.*
Provisional Application 61/319786, Liu et al.*
Gu, Wenjun, et al. "Null Data Frame: A Double-Edged Sword in IEEE 802.11 WLANs," IEEE Transactions on Parallel and Distributed Systems, vol. 21, No. 7, Jul. 2010.
European Search Report—EP13004873—Search Authority—Hague—Nov. 7, 2013.
European Search Report—EP13004874—Search Authority—The Hague—Nov. 14, 2013.
Draft Amendment to Standard [for] Information Technology—Telecommunications and information exchange between systems—Local and Metropolitan networks—Specific requirements—Part 11: Wireless LAN Medium Access Control (MAC) and Physical Layer (PHY) specifications: Enhancements for Higher Throughput, IEEE P802.11n./D1.0, Mar. 2006, pp. 1-40, URL, http://read.pudn.com/downloads165/doc/fileformat/755403/P802.11n-D1.0.pdf.
IEEE Standard for Information technology—Telecommunications and information exchange between systems—Local and metropolitan area networks—Specific requirements, Part 11: Wireless LAN Medium Access Control (MAC)and Physical Layer (PHY) Specifications, IEEE Std 802.11n.2009, Amendment 5: Enhancements for Higher Throughput, Oct. 29, 2009, URL, http://luci.subsignal.org/~jow/802.11n-2009.pdf.
3GPP: 3GPP Draft; 25814-140, 3rd Generation Partnership Project (3GPP), Mobile Competence Centre ; 650, Route Des Lucioles ; F-06921 Sophia-Anti Polis Cedex; France, vol. RAN WG1, No. Shanghai, China; 20060522, May 22, 2006 (May 22, 2006), XP050101999, [retrieved on May 22, 2006] tables 7.1.1.2.3.1-1 sections 7.1.1.2.1, 7.1.1.2.2, 7.1.1.2.3.1, 7.1.1.4.3, 7.1.2.4.1, 7.1.2.4.5.1, 7.1.2.4.5.2, 7.1.2.4.6.3, 7.1.3.1.1.1.
802.11 Working Group: "IEEE 802.11N Part 11: Wireless LAN Medium Access Control (MAC) and Physical Layer (PHY) specifications: Enhancements for Higher Throughput" IEEE, Mar. 2006 (Mar. 2006), XP002469313 cited in the application.
Ahmadi S, "An overview of next-generation mobile WiMAX technology", IEEE Communications Magazine, IEEE Service Center, Piscataway, US, vol. 47, No. 6, Jun. 1, 2009 (Jun. 1, 2009), pp. 84-98, XP011281828, ISSN: 0163-6804, DOI: DOI:10.1109/MCOM.2009.5116805.
International Search Report and Written Opinion—PCT/US2011/043260—ISA/EPO—Feb. 23, 2012.
Love D.J., et al., "An overview of limited feedback in wireless communication systems", IEEE Journal on Selected Areas in Communications, IEEE Service Center, Piscataway, US, vol. 26, No. 8, Oct. 1, 2008 (Oct. 1, 2008), pp. 1341-1365, XP011236212, ISSN: 0733-8716, DOI: 10.1109/JSAC.2008.081002.
Tang T., et al., "Opportunistic Feedback for Multiuser MIMO Systems With Linear Receivers", IEEE Transactions on Communications, IEEE Service Center, Piscataway, NJ. USA,vol. 55, No. 5, May 1, 2007 (May 1, 2007),pp. 1020-1032, XP011181279, ISSN: 0090-6778, DOI: 10.1109/TCOMM.2007.896013.

* cited by examiner

CHANNEL STATE INFORMATION (CSI) FEEDBACK PROTOCOL FOR MULTIUSER MULTIPLE INPUT, MULTIPLE OUTPUT (MU-MIMO)

CROSS-REFERENCE TO RELATED APPLICATIONS

This application claims benefit of U.S. Provisional Patent Application Ser. No. 61/361,952, filed Jul. 7, 2010, which is herein incorporated by reference.

BACKGROUND

Field

Certain aspects of the present disclosure generally relate to wireless communications and, more particularly, to channel state information (CSI) feedback protocol for multiuser multiple-input multiple-output (MU-MIMO) transmission.

Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure generally relate to channel state information (CSI) feedback protocol for multiuser multiple-input multiple-output (MU-MIMO) transmission.

Certain aspects of the present disclosure provide a method for wireless communications. The method generally includes generating a training frame and transmitting the generated training frame. The training frame typically includes first information identifying a group of one or more apparatuses; and second information indicating whether each of the apparatuses in the group is to determine at least one characteristic of a channel.

Certain aspects of the present disclosure provide an apparatus for wireless communications. The apparatus generally includes a processing system configured to generate a training frame and a transmitter configured to transmit the generated training frame. The training frame typically includes first information identifying a group of one or more apparatuses; and second information indicating whether each of the apparatuses in the group is to determine at least one characteristic of a channel.

Certain aspects of the present disclosure provide an apparatus for wireless communications. The apparatus generally includes means for generating a training frame and means for transmitting the generated training frame. The training frame typically includes first information identifying a group of one or more apparatuses; and second information indicating whether each of the apparatuses in the group is to determine at least one characteristic of a channel.

Certain aspects of the present disclosure provide a computer-program product for wireless communications. The computer-program product generally includes a computer-readable medium comprising instructions executable to generate a training frame and transmit the generated training frame. The training frame typically includes first information identifying a group of one or more apparatuses; and second information indicating whether each of the apparatuses in the group is to determine at least one characteristic of a channel.

Certain aspects of the present disclosure provide an access point. The access point generally includes at least one antenna, a processing system configured to generate a training frame, and a transmitter configured to transmit, via the at least one antenna, the generated training frame. The training frame generally includes first information identifying a group of one or more apparatuses and second information indicating whether each of the apparatuses in the group is to determine at least one characteristic of a channel.

Certain aspects of the present disclosure provide a method for wireless communications. The method generally includes receiving, at an apparatus, a training frame—typically including first information identifying a group of one or more apparatuses and second information indicating whether each of the apparatuses in the group is to determine at least one characteristic of a channel—determining whether the apparatus is in the group of apparatuses according to the first information; and deciding whether to determine the at least one characteristic of the channel based on the second information, if the apparatus is in the group of apparatuses.

Certain aspects of the present disclosure provide an apparatus for wireless communications. The apparatus generally includes a receiver and a processing system. The receiver is typically configured to receive a training frame that includes first information identifying a group of one or more apparatuses and second information indicating whether each of the apparatuses in the group is to determine at least one characteristic of a channel. The processing system is typically configured to determine whether the apparatus is in the group of apparatuses according to the first information and to decide whether to determine the at least one characteristic of the channel based on the second information, if the apparatus is in the group of apparatuses.

Certain aspects of the present disclosure provide an apparatus for wireless communications. The apparatus generally includes means for receiving a training frame—typically including first information identifying a group of one or more apparatuses and second information indicating whether each of the apparatuses in the group is to determine at least one characteristic of a channel—means for determining whether the apparatus is in the group of apparatuses according to the first information; and means for deciding whether to determine the at least one characteristic of the channel based on the second information, if the apparatus is in the group of apparatuses.

Certain aspects of the present disclosure provide a computer-program product for wireless communications. The computer-program product generally includes a computer-readable medium comprising instructions executable to receive, at an apparatus, a training frame—typically including first information identifying a group of one or more apparatuses and second information indicating whether each of the apparatuses in the group is to determine at least one characteristic of a channel—determine whether the apparatus is in the group of apparatuses according to the first information; and decide whether to determine the at least one characteristic of the channel based on the second information, if the apparatus is in the group of apparatuses.

Certain aspects of the present disclosure provide a wireless device. The wireless device generally includes at least one antenna, a receiver, and a processing system. The receiver is typically configured to receive, via the at least one antenna, a training frame, which includes first information identifying a group of one or more apparatuses and second information indicating whether each of the apparatuses in the group is to determine at least one characteristic of a channel. The processing system is generally configured to determine whether the wireless device is in the group of apparatuses according to the first information and to decide whether to determine the at least one characteristic of the channel based on the second information, if the wireless device is in the group of apparatuses.

Certain aspects of the present disclosure provide a method for wireless communications. The method generally includes receiving, at an apparatus, a request; and transmitting, in response to the received request, a packet using frame aggregation, wherein two or more frames are transmitted in a single transmission using a single header.

Certain aspects of the present disclosure provide an apparatus for wireless communications. The apparatus generally includes a receiver configured to receive a request and a transmitter configured to transmit, in response to the received request, a packet using frame aggregation, wherein two or more frames are transmitted in a single transmission using a single header.

Certain aspects of the present disclosure provide an apparatus for wireless communications. The apparatus generally includes means for receiving a request and means for transmitting, in response to the received request, a packet using frame aggregation, wherein two or more frames are transmitted in a single transmission using a single header.

Certain aspects of the present disclosure provide a computer-program product for wireless communications. The computer-program product generally includes a computer-readable medium comprising instructions executable to receive, at an apparatus, a request; and transmit, in response to the received request, a packet using frame aggregation, wherein two or more frames are transmitted in a single transmission using a single header.

Certain aspects of the present disclosure provide a wireless device. The wireless device generally includes at least one antenna; a receiver configured to receive, via the at least one antenna, a request; and a transmitter configured to transmit, in response to the received request, a packet using frame aggregation, wherein two or more frames are transmitted in a single transmission using a single header.

Certain aspects of the present disclosure provide a method for wireless communications. The method generally includes transmitting a request and receiving, in response to the transmitted request, a packet employing frame aggregation, wherein two or more frames were sent in a single transmission using a single header.

Certain aspects of the present disclosure provide an apparatus for wireless communications. The apparatus generally includes a transmitter configured to transmit a request and a receiver configured to receive, in response to the transmitted request, a packet employing frame aggregation, wherein two or more frames were sent in a single transmission using a single header.

Certain aspects of the present disclosure provide an apparatus for wireless communications. The apparatus generally includes means for transmitting a request and means for receiving, in response to the transmitted request, a packet employing frame aggregation, wherein two or more frames were sent in a single transmission using a single header.

Certain aspects of the present disclosure provide a computer-program product for wireless communications. The computer-program product generally includes a computer-readable medium comprising instructions executable to transmit a request and receive, in response to the transmitted request, a packet employing frame aggregation, wherein two or more frames were sent in a single transmission using a single header.

Certain aspects of the present disclosure provide an access point. The access point generally includes at least one antenna; a transmitter configured to transmit, via the at least one antenna, a request; and a receiver configured to receive, in response to the transmitted request, a packet employing frame aggregation, wherein two or more frames were sent in a single transmission using a single header.

Certain aspects of the present disclosure provide a method for wireless communications. The method generally includes transmitting, to an apparatus, a first request to send at least one characteristic of a channel; receiving, in response to the transmitted first request, a packet from the apparatus; and transmitting, to the apparatus, a second request to send the at least one characteristic of the channel, wherein the second request comprises an acknowledgment (ACK) indicating that the packet was received.

Certain aspects of the present disclosure provide an apparatus for wireless communications. The apparatus generally includes a transmitter configured to transmit, to another apparatus, a first request to send at least one characteristic of a channel; and a receiver configured to receive, in response to the transmitted first request, a packet from the other apparatus, wherein the transmitter is configured to transmit, to the other apparatus, a second request to send the at least one characteristic of the channel, wherein the second request comprises an acknowledgment (ACK) indicating that the packet was received.

Certain aspects of the present disclosure provide an apparatus for wireless communications. The apparatus generally includes means for transmitting, to another apparatus, a first request to send at least one characteristic of a channel; and means for receiving, in response to the transmitted first request, a packet from the other apparatus, wherein the means for transmitting is configured to transmit, to the other apparatus, a second request to send the at least one characteristic of the channel, wherein the second request comprises an acknowledgment (ACK) indicating that the packet was received.

Certain aspects of the present disclosure provide a computer-program product for wireless communications. The computer-program product generally includes a computer-readable medium comprising instructions executable to transmit, to an apparatus, a first request to send at least one characteristic of a channel; receive, in response to the transmitted first request, a packet from the apparatus; and transmit, to the apparatus, a second request to send the at least one characteristic of the channel, wherein the second request comprises an acknowledgment (ACK) indicating that the packet was received.

Certain aspects of the present disclosure provide an access point. The access point generally includes at least one antenna; a transmitter configured to transmit, to an apparatus via the at least one antenna, a first request to send at least one characteristic of a channel; and a receiver configured to receive, in response to the transmitted first request, a packet from the apparatus, wherein the transmitter is configured to transmit, to the apparatus, a second request to send the at least one characteristic of the channel, wherein the second request comprises an acknowledgment (ACK) indicating that the packet was received.

Certain aspects of the present disclosure provide a method for wireless communications. The method generally includes receiving a first request to send at least one characteristic of a channel, transmitting a packet in response to the received first request, and receiving a second request to send the at least one characteristic of the channel, wherein the second request comprises an acknowledgment (ACK) indicating that the packet was received by an apparatus.

Certain aspects of the present disclosure provide an apparatus for wireless communications. The apparatus generally includes a receiver configured to receive a first request to send at least one characteristic of a channel and a transmitter configured to transmit a packet in response to the received first request, wherein the receiver is configured to receive a second request to send the at least one characteristic of the channel and wherein the second request comprises an acknowledgment (ACK) indicating that the packet was received by another apparatus.

Certain aspects of the present disclosure provide an apparatus for wireless communications. The apparatus generally includes means for receiving a first request to send at least one characteristic of a channel and means for transmitting a packet in response to the received first request, wherein the means for receiving is configured to receive a second request to send the at least one characteristic of the channel and wherein the second request comprises an acknowledgment (ACK) indicating that the packet was received by another apparatus.

Certain aspects of the present disclosure provide a computer-program product for wireless communications. The computer-program product generally includes a computer-readable medium comprising instructions executable to receive a first request to send at least one characteristic of a channel; transmit a packet in response to the received first request; and receive a second request to send the at least one characteristic of the channel, wherein the second request comprises an acknowledgment (ACK) indicating that the packet was received by an apparatus.

Certain aspects of the present disclosure provide a wireless device. The wireless device generally includes at least one antenna; a receiver configured to receive, via the at least one antenna, a first request to send at least one characteristic of a channel; and a transmitter configured to transmit a packet in response to the received first request, wherein the receiver is configured to receive a second request to send the at least one characteristic of the channel and wherein the second request comprises an acknowledgment (ACK) indicating that the packet was received by an apparatus.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
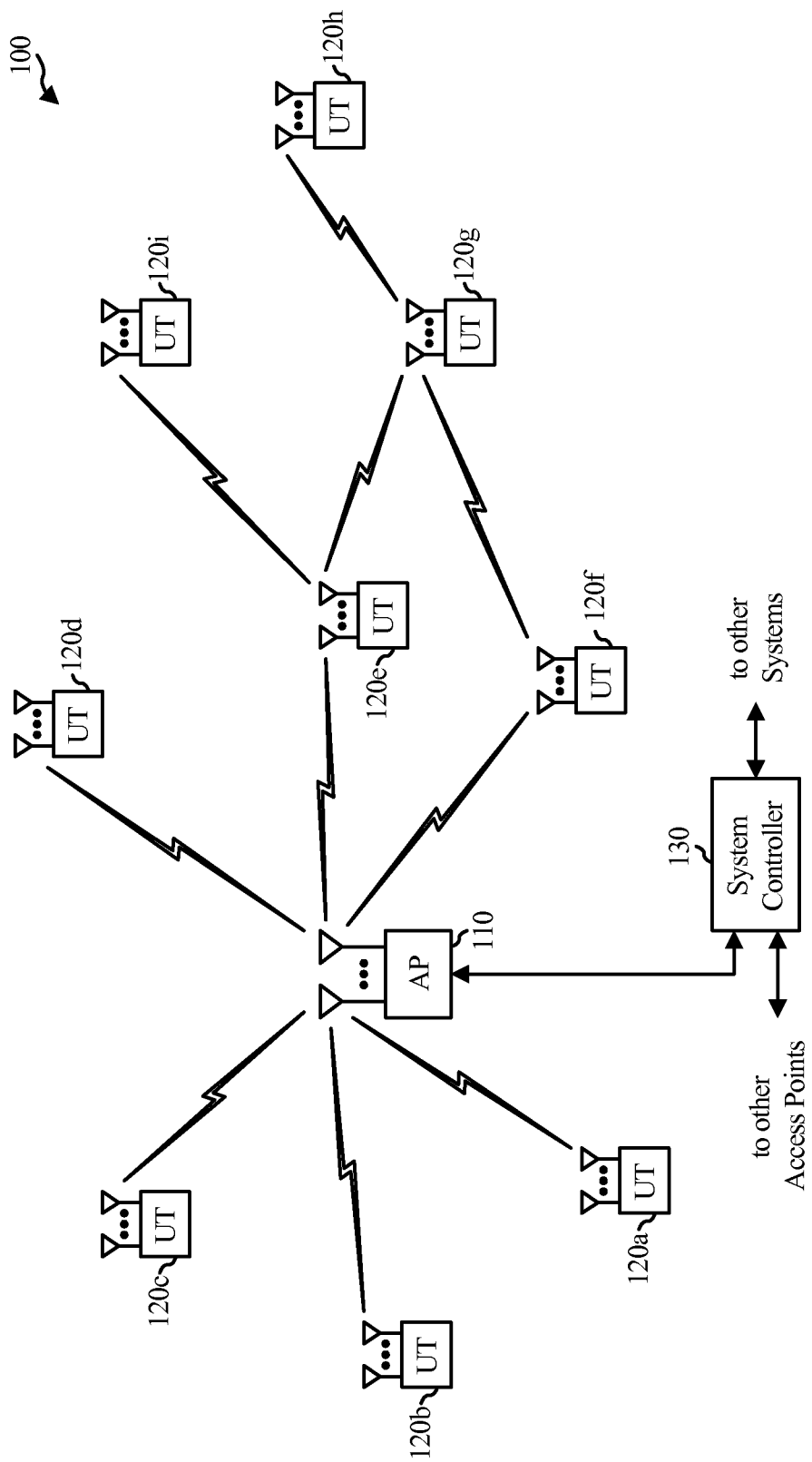
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as Node B, Radio Network Controller ("RNC"), an evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals, and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means, K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
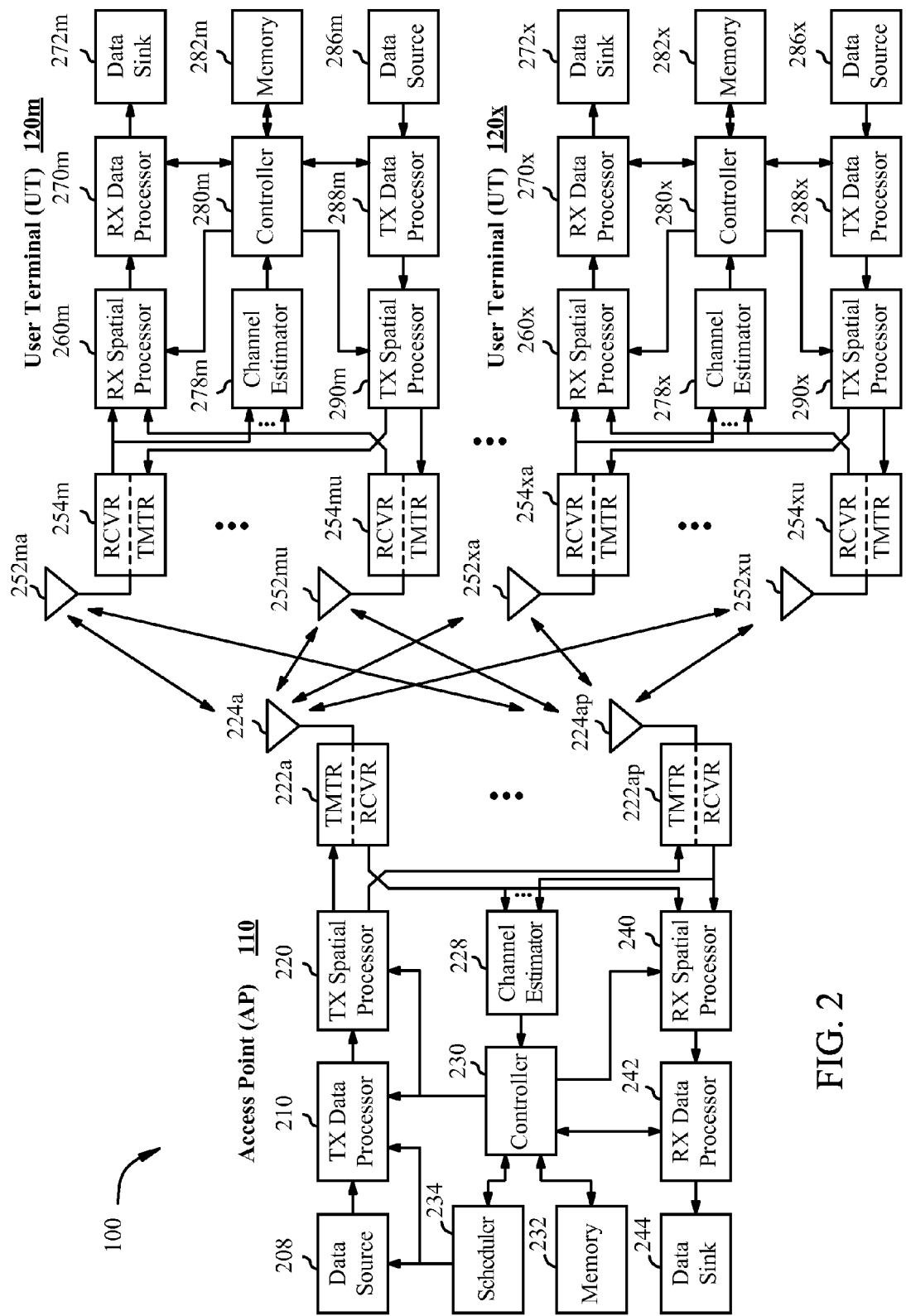
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC) or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates and so on) to the access point. Controllers 230 and 280 also control the operation of various processing units at access point 110 and user terminal 120, respectively.

Figure 3:
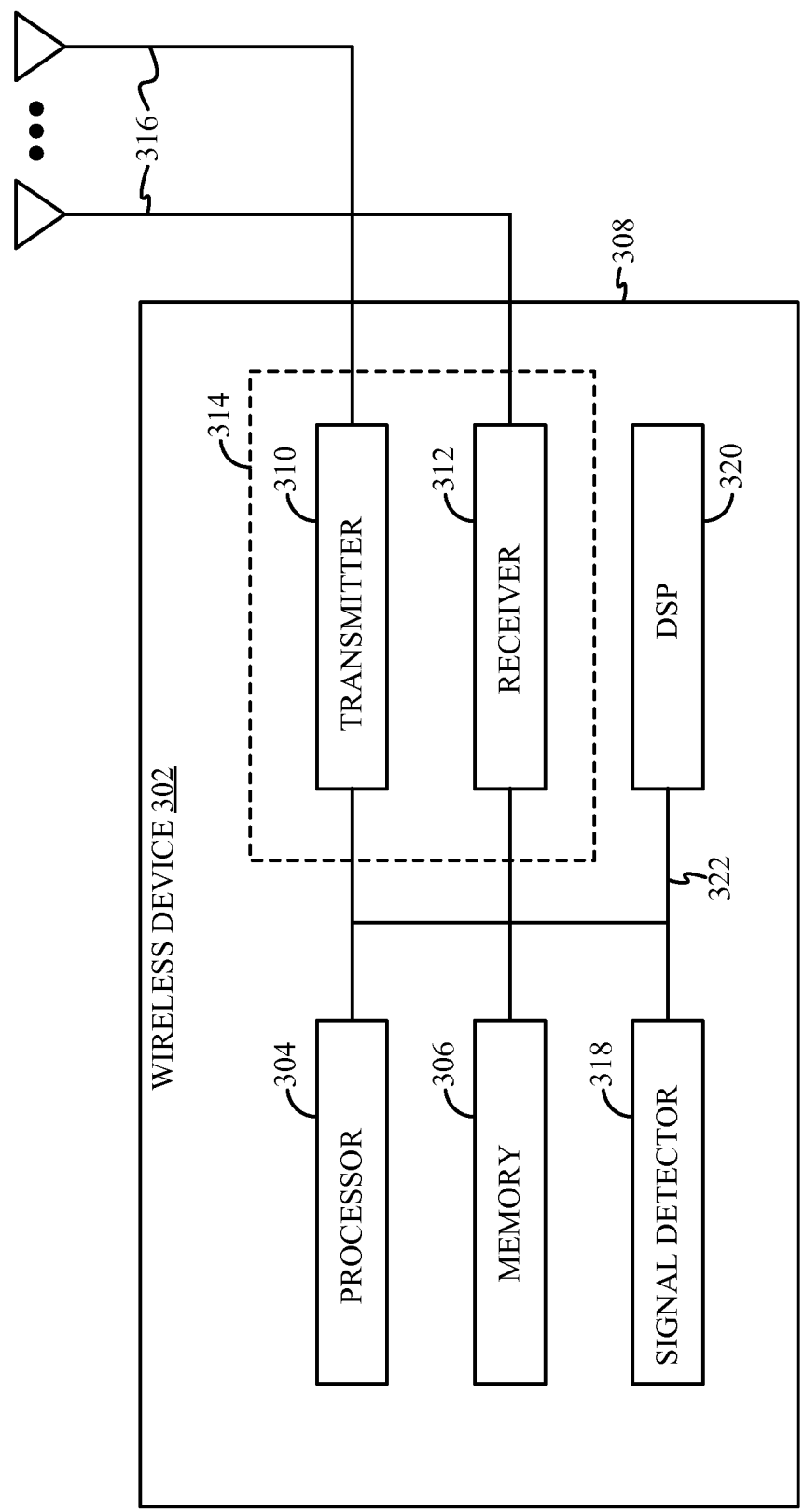
FIG. 3 illustrates a block diagram of an example wireless device in accordance with certain aspects of the present disclosure.

FIG. 3 illustrates various components that may be utilized in a wireless device 302 that may be employed within the wireless communication system, such as the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In next generation WLANs, such as the MIMO system 100 from FIG. 1, downlink (DL) multi-user (MU) MIMO transmission may represent a promising technique to increase overall network throughput.

Example Csi Feedback Protocol for Mu-Mimo

Channel state information (CSI) feedback is essential for DL MU-MIMO. In order for an AP to obtain CSI feedback from a plurality of stations (STAs), an access point sends a training frame, such as a null data packet (NDP), followed by requests (e.g., CSI polls) to a plurality of stations to send channel conditions estimated from the training frame.

Figure 4:
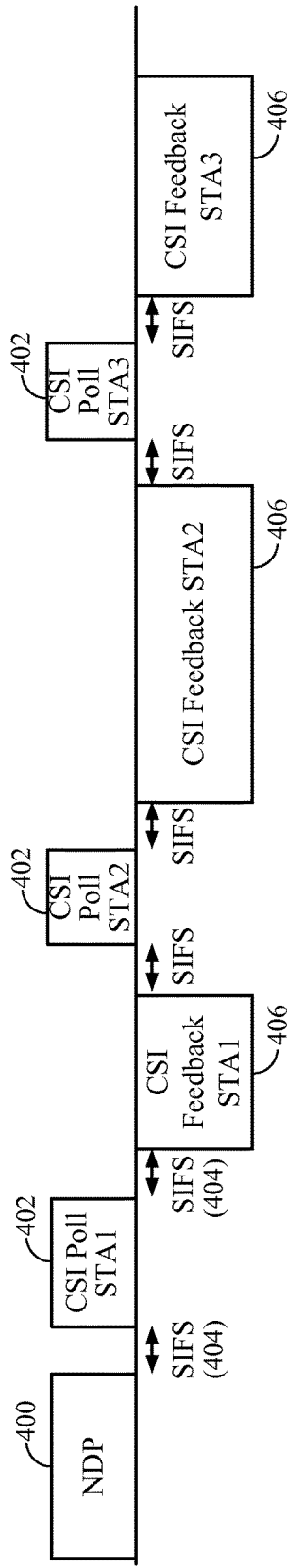
FIG. 4 illustrates an example channel state information (CSI) feedback protocol sequence for multiuser multiple-input multiple-output (MU-MIMO), in accordance with certain aspects of the present disclosure.

As illustrated in FIG. 4, the AP may first send an NDP 400 as a training frame. The AP may then send a CSI Poll 402 to each STA to request CSI feedback. The first CSI Poll 402 may be sent a short interframe space (SIFS) 404 after the NDP 400. For example, a CSI Poll may be a quality of service (QoS)-Null frame with a high throughput (HT) Control field that has a value of 1 in the CSI/Steering subfield.

STAs that receive the NDP 400 may estimate and store the channel conditions. After the STAs receive a CSI Poll 402, the STAs may send CSI feedback 406 of the stored channel conditions a SIFS 404 after the STAs receive the corresponding CSI Poll 402.

Figure 5:
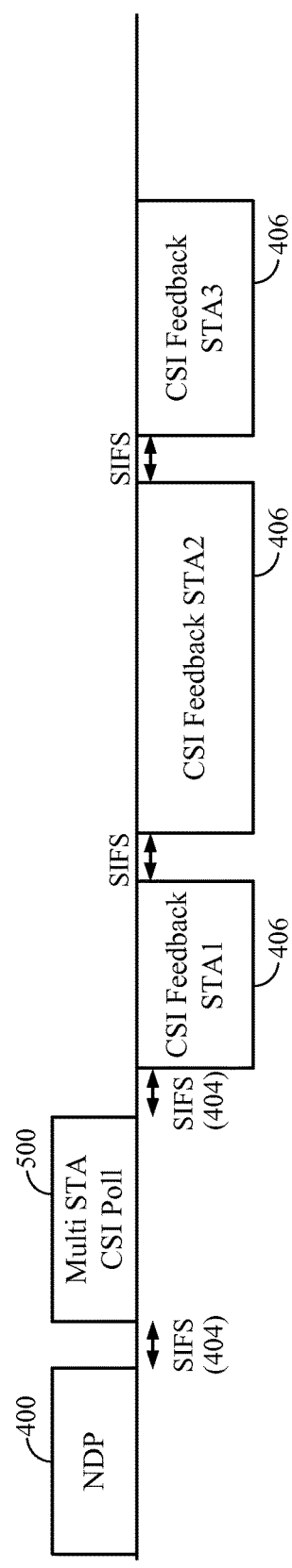
FIG. 5 illustrates an example sequential CSI feedback protocol sequence for MU-MIMO, in accordance with certain aspects of the present disclosure.

FIG. 5 illustrates an example sequential CSI feedback protocol sequence for MU-MIMO, in accordance with certain aspects of the present disclosure. Rather than a CSI Poll 402 for each STA, the sequential CSI feedback protocol sequence entails sending a CSI Poll intended for multiple STAs (i.e., a multi-STA CSI Poll 500). Using the multi-STA CSI Poll 500, all the CSI Poll information for all STAs may fit in a single management frame. For certain aspects, the reply order may be implicit in the multi-STA CSI Poll 500.

The training message may include one or more signal fields. For certain aspects, one of the signal fields may include an AP identifier, which may be defined at network association. With an AP identifier in the training message, STAs may ignore NDPs from overlapping basic service set (OBSS) APs.

For other aspects, the signal field bits in the training message may be set to a random/sequence number. For certain aspects, the CSI Poll 402 may also carry this random/sequence number. In this manner, the AP may tag the NDP 400 for which the CSI Feedback 406 is requested. This may prevent a STA from sending CSI feedback for an "old" NDP or an NDP the STA received from an OBSS.

For certain aspects, some of the signal field bits in the training message may be set to a group identifier (ID). STAs that are not in the group may ignore the training message. In this manner, STA power for channel estimation/processing is conserved.

An Example Training Frame

For certain aspects, one or more bits may be used to indicate whether each STA, among the group signaled by the "group" (see above), is supposed to compute CSI or not. Using such bits may enable further power saving by the STA. For the case where the group identifier indicates a single user transmission, an additional 8 bits may be used as a station (STA) identifier (ID) to allow other STAs to ignore the training frame. The group identifier alone does not identify which STA is the intended recipient.

Figure 6:
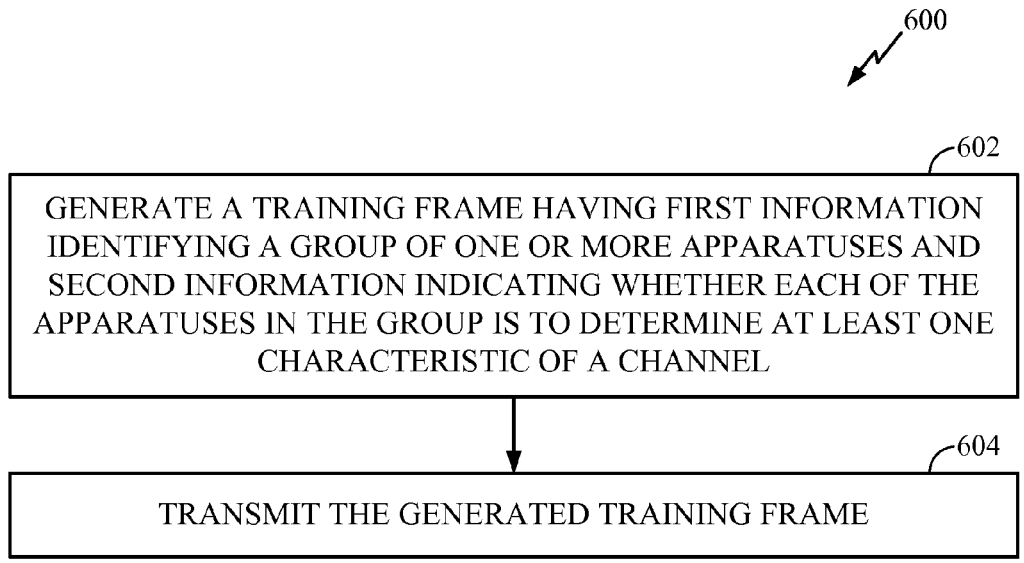
FIG. 6 illustrates example operations that may be performed at an access point (AP) to transmit a training frame in an effort to determine at least one characteristic of a channel, in accordance with certain aspects of the present disclosure.

FIG. 6 illustrates example operations 600 that may be performed at an access point (AP), for example, to transmit a training frame in an effort to determine at least one characteristic of a channel, in accordance with certain aspects of the present disclosure. The operations 600 may begin, at 602, by generating a training frame having first information identifying a group of one or more apparatuses and second information indicating whether each of the apparatuses in the group is to determine at least one characteristic of a channel. The at least one characteristic of the channel may comprise CSI. At 604, the generated frame may be transmitted.

For certain aspects, the training frame may comprise an NDP. The first information may comprise a group identifier using signal field bits of the NDP. The group identifier may indicate a single user transmission, and the second information may comprise a STA ID using eight bits of the NDP. For certain aspects, the training frame may comprise an identifier (ID) of an apparatus transmitting the generated frame. The training frame may comprise a sequence number for certain aspects.

Figure 7:
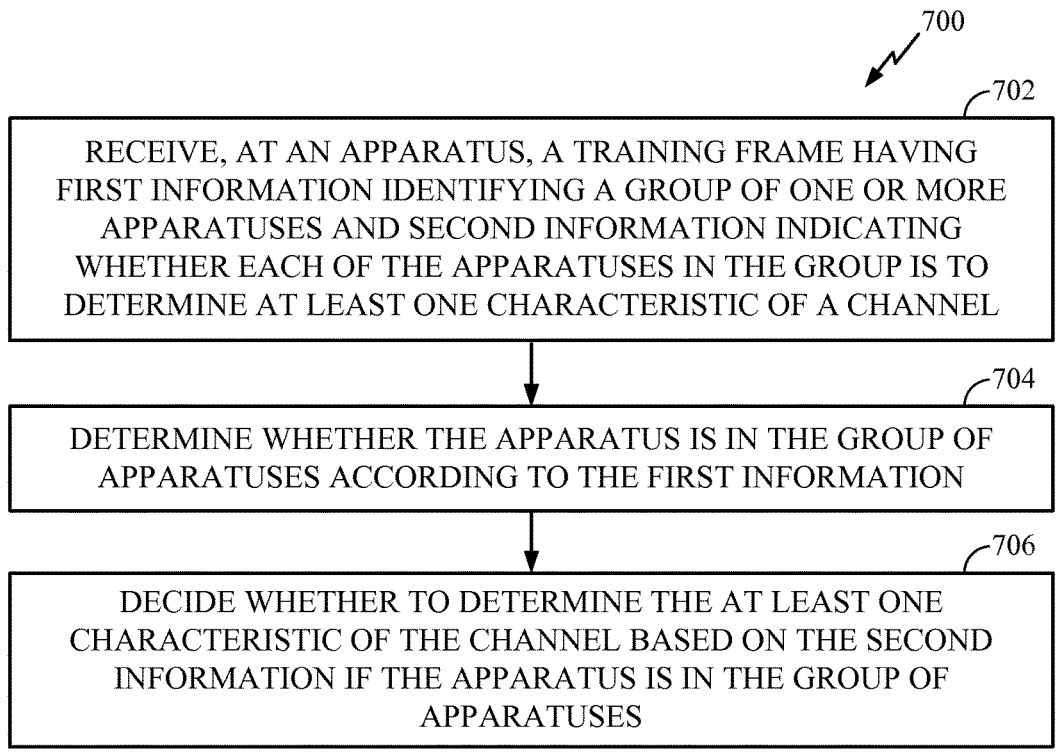
FIG. 7 illustrates example operations that may be performed at a station (STA) to decide whether to determine at least one characteristic of a channel based on information received in a training frame, in accordance with certain aspects of the present disclosure.
Figure 7A:
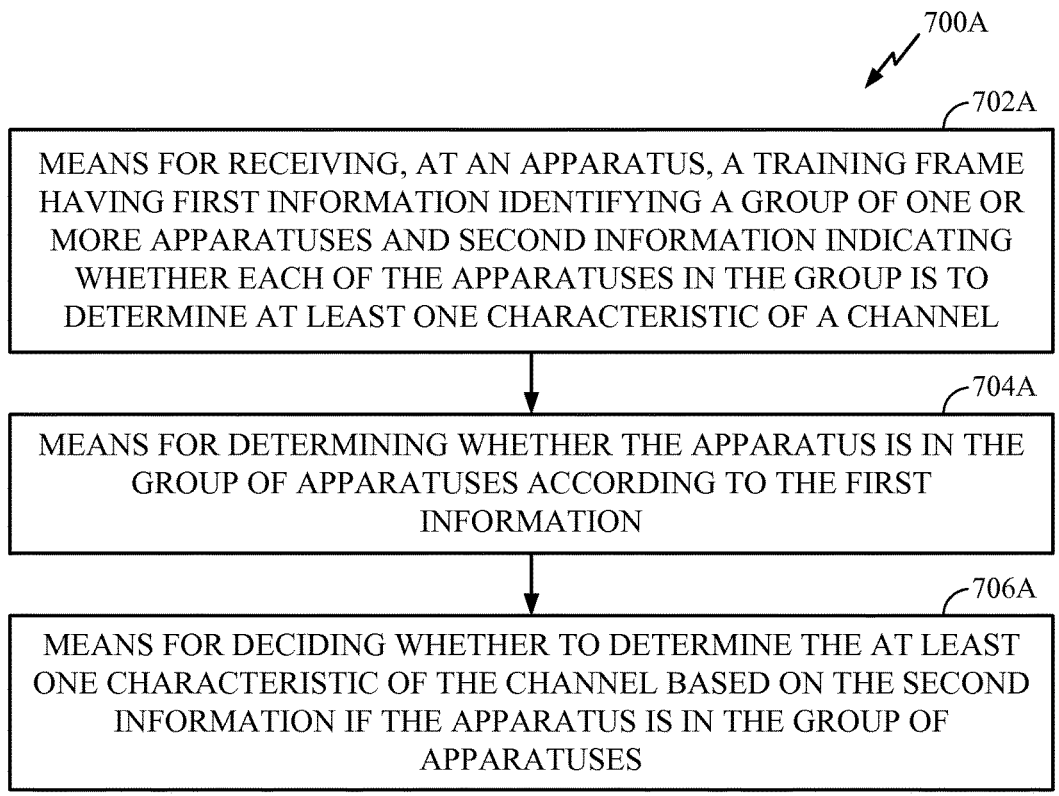
FIG. 7A illustrates example means capable of performing the operations shown in FIG. 7.

FIG. 7 illustrates example operations 700 that may be performed at a station (STA) to decide whether to determine at least one characteristic of a channel based on information received in a training frame, in accordance with certain aspects of the present disclosure. The operations 700 may begin, at 702, by receiving, at an apparatus (e.g., a STA), a training frame having first information identifying a group of one or more apparatuses and second information indicating whether each of the apparatuses in the group is to determine at least one characteristic of a channel. The at least one characteristic of the channel may comprise CSI. At 704, the apparatus may determine whether the apparatus is in the group of apparatuses according to the first information. If the apparatus is in the group of apparatuses, the apparatus may decide, at 706, whether to determine the at least one characteristic of the channel based on the second information.

For certain aspects, the training frame may comprise an NDP. The first information may comprise a group identifier using signal field bits of the NDP. The group identifier may indicate a single user transmission, and the second information may comprise a STA ID for the apparatus using eight bits of the NDP. For certain aspects, the training frame may comprise an ID of an apparatus that transmitted the training frame. The training frame may comprise a sequence number for certain aspects.

An Example CSI Poll Message

For certain aspects, the CSI Poll 402 may include an acknowledgment (ACK) indication for the previous frame sent as a response to the poll. The ACK may comprise a single bit, for example. Using the ACK may enable a STA to decide whether to send new CSI or not. Furthermore, the ACK may enable STA rate adaptation.

For certain aspects, the CSI Poll 402 may include an additional sequence number representing the sequence number of the CSI stored at the AP (e.g., the sequence number sent along with a previous CSI packet from the STA, as described below).

Figure 8:
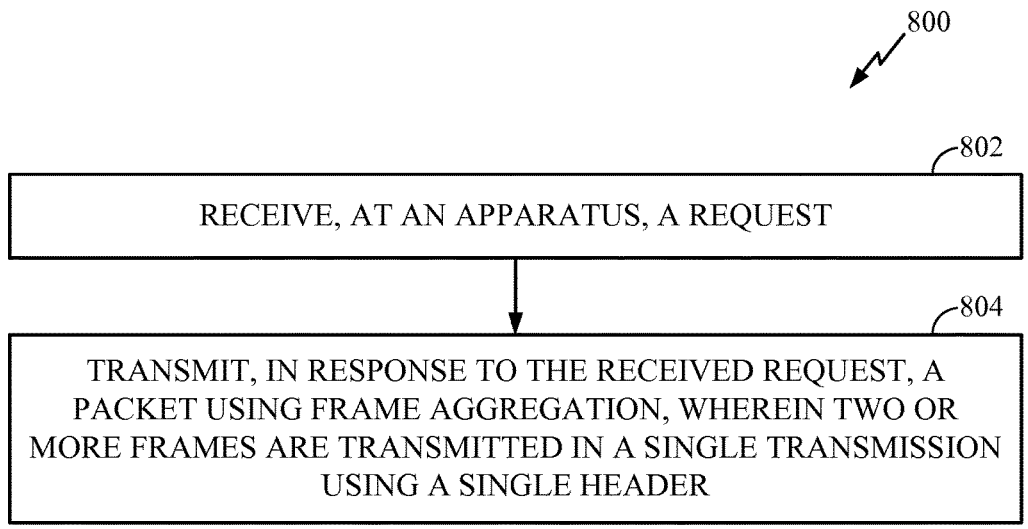
FIG. 8 illustrates example operations that may be performed at a STA to reply to a request by transmitting a packet using frame aggregation, in accordance with certain aspects of the present disclosure.
Figure 8A:
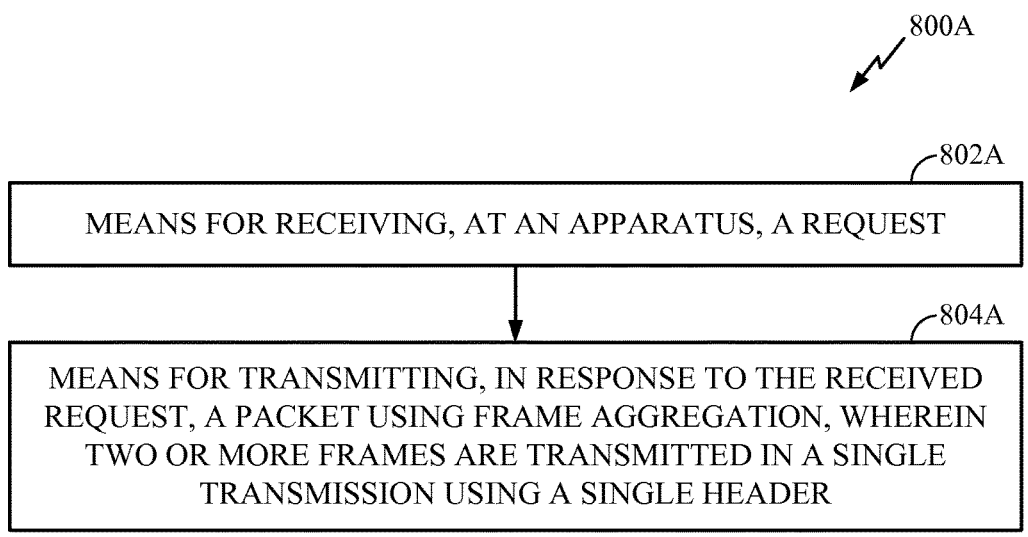
FIG. 8A illustrates example means capable of performing the operations shown in FIG. 8.

FIG. 8 illustrates example operations 800 that may be performed at a STA to reply to a request by transmitting a packet using frame aggregation, in accordance with certain aspects of the present disclosure. The operations 800 may begin, at 802, by receiving a request at an apparatus (e.g., a STA). At 804, the apparatus may transmit, in response to the received request, a packet using frame aggregation, wherein two or more frames are transmitted in a single transmission using a single header. The request may comprise a request to send the packet indicating at least one characteristic of a channel, such as CSI. For certain aspects, the packet may comprise aggregated media access control (MAC) protocol data units (A-MPDUs). The A-MPDUs may represent the at least one characteristic of the channel.

For certain aspects, the packet may comprise data indicating the request was received without providing the at least one characteristic of the channel in response to the request. The packet may also comprise an acknowledgment (ACK) message. For certain aspects, the packet may comprise data indicating the request was received, and the data about the at least one characteristic of the channel may be provided in a subsequent transmission.

For other aspects, the packet may comprise data (which may be encoded) representing the at least one characteristic of the channel. The data may comprise data to reconstruct the at least one characteristic of the channel from multiple A-MPDUs.

For certain aspects, the packet may comprise a sequence number included in a received training frame used to determine the at least one characteristic of the channel or generated by the apparatus. The packet may comprise data about transmit and receive antenna indices for certain aspects.

Figure 9:
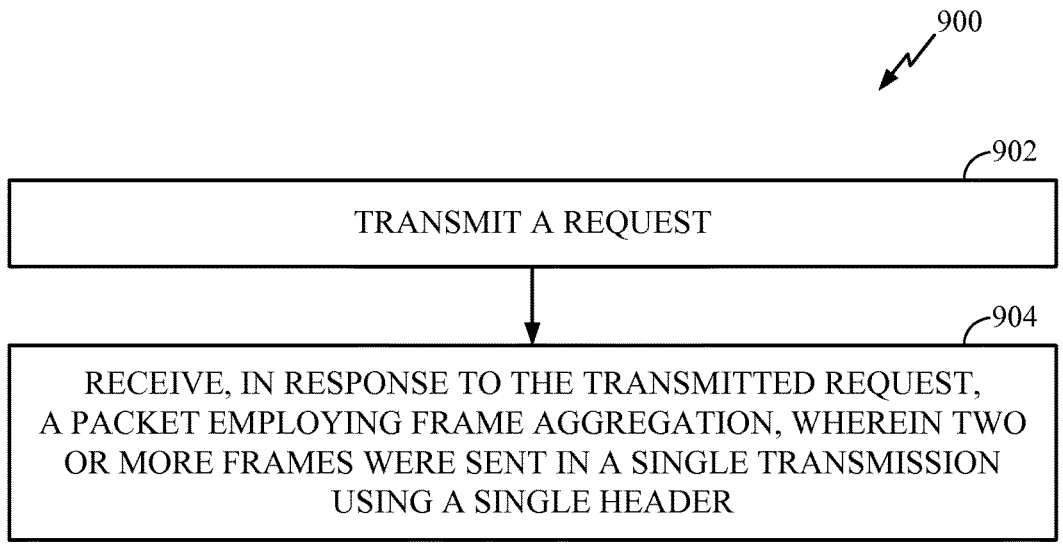
FIG. 9 illustrates example operations that may be performed at an AP to receive a packet employing frame aggregation in response to a transmitted request, in accordance with certain aspects of the present disclosure.
Figure 9A:
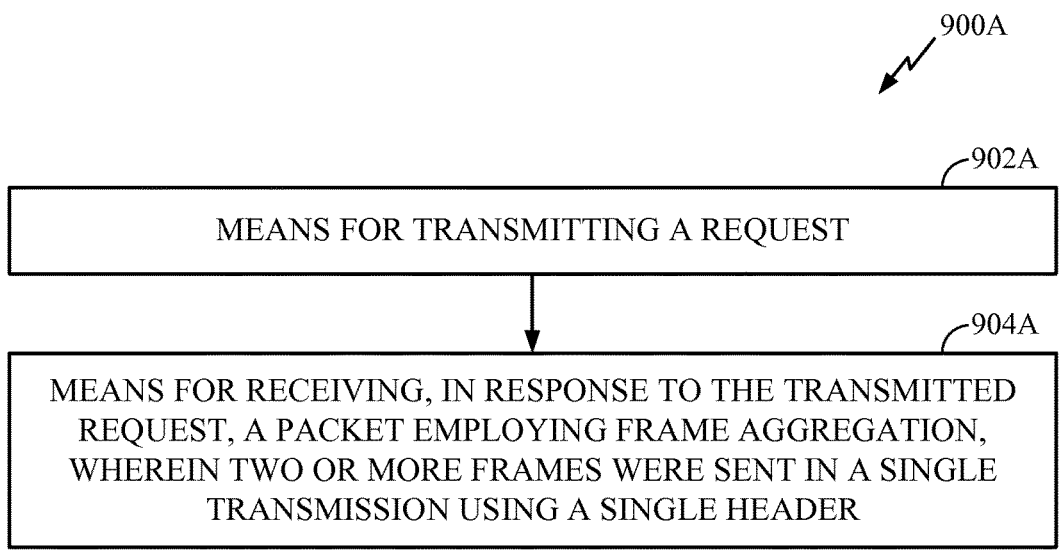
FIG. 9A illustrates example means capable of performing the operations shown in FIG. 9.

FIG. 9 illustrates example operations 900 that may be performed at an AP or other apparatus to receive a packet employing frame aggregation in response to a transmitted request, in accordance with certain aspects of the present disclosure. The operations 900 may begin, at 902, by transmitting a request, such as a request to send at least one characteristic of a channel (e.g., CSI). At 904, the apparatus may receive—in response to the transmitted request—a packet employing frame aggregation, wherein two or more frames were sent in a single transmission using a single header.

For certain aspects, the packet may comprise A-MPDUs. The A-MPDUs may represent the at least one characteristic of the channel.

For certain aspects, the packet may comprise data indicating the at least one characteristic of the channel will not be provided. The packet may also comprise an ACK message. For certain aspects, the packet may comprise data indicating the at least one characteristic of the channel may be provided in a subsequent transmission.

For other aspects, the packet may comprise data (which may be encoded) representing the at least one characteristic of the channel. The data may comprise data to reconstruct the at least one characteristic of the channel from multiple A-MPDUs. The packet may comprise data about transmit and receive antenna indices for certain aspects.

An Example CSI Feedback Message

For certain aspects, the CSI Feedback 406 may be transmitted using frame aggregation. For example, the CSI data may be transmitted by using A-MPDUs (in accordance with IEEE 802.11n, for example). A-MPDUs may be used with a no-ACK policy, for certain aspects.

For certain aspects, the CSI Feedback 406 may include various indications. For example, the CSI Feedback 406 may include a "There is no new CSI" field (comprising one bit, for example), indicating that the CSI Poll 402 was received, but that the CSI will not be sent in the CSI Feedback 406. In the alternative, a normal ACK may be sent to indicate this case.

For other aspects or at other times, the CSI Feedback 406 may include a delayed CSI field (comprising one bit, for example), indicating that the STA has received the CSI Poll 402, but will respond later with the CSI.

The CSI data may be encoded when sent in the CSI Feedback 406. For certain aspects, the properties of the CSI data encoding (e.g., compression, quantization, differential, etc.) may be included in the CSI Feedback 406.

For certain aspects, the CSI Feedback 406 may include information to reassemble the CSI from multiple MPDUs. The CSI may be partitioned in smaller chunks (e.g., one MPDU per TX-RX antenna pair). In this case, certain information (e.g., data about the transmit and receive antenna indices) may be used to reconstruct the full CSI.

The CSI Feedback 406 may include a sequence number. For certain aspects, the sequence number may be the same sequence number from the NDP 400. For other aspects, the sequence number included in the CSI Feedback 406 may be a new sequence number generated by the STA.

Figure 10:
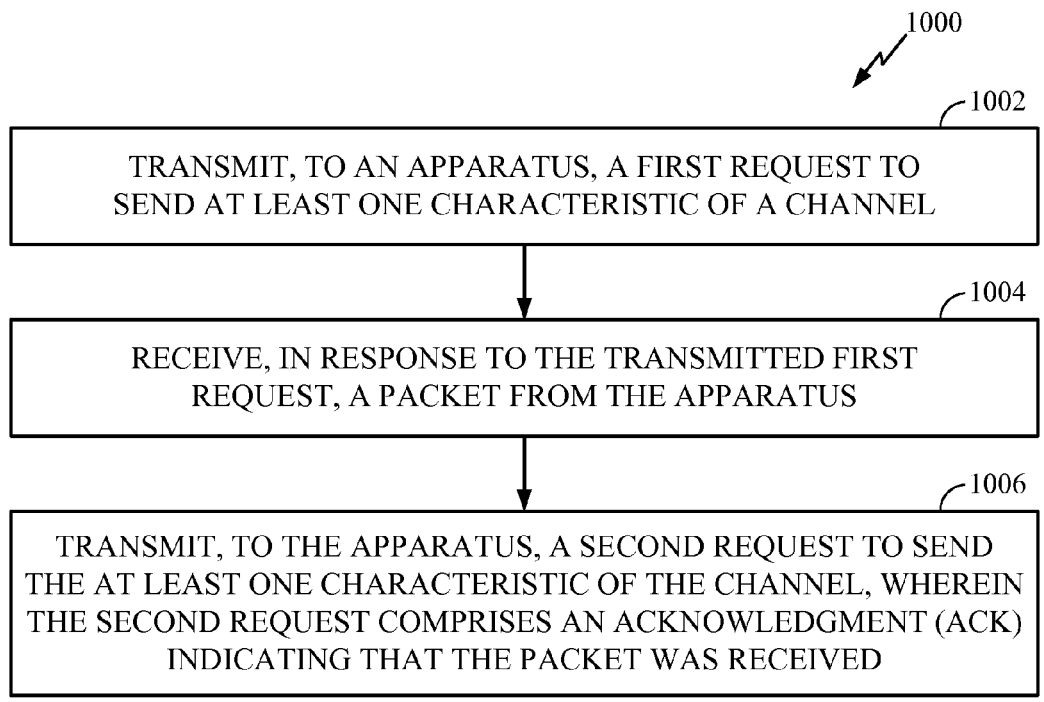
FIG. 10 illustrates example operations that may be performed at AP to transmit a request to send at least one characteristic of a channel accompanied by an acknowledgment (ACK) of a packet received in a previous transmitted request, in accordance with certain aspects of the present disclosure.
Figure 10A:
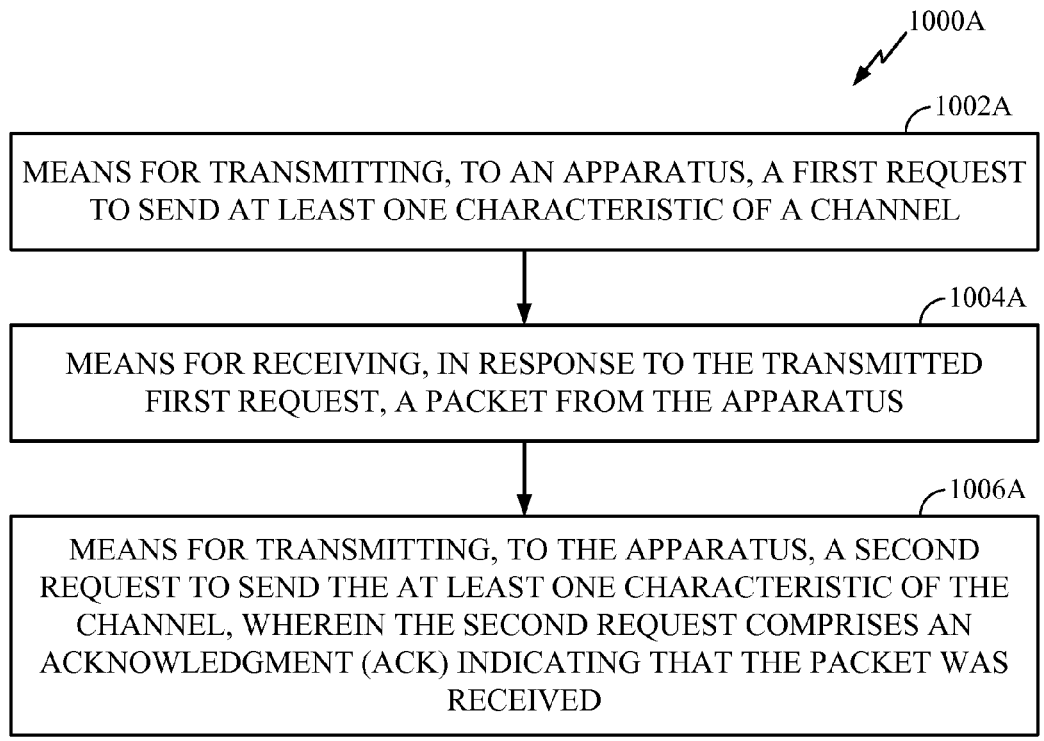
FIG. 10A illustrates example means capable of performing the operations shown in FIG. 10.

FIG. 10 illustrates example operations 1000 that may be performed at an AP, for example, to transmit a request to send at least one characteristic of a channel accompanied by an acknowledgment (ACK) of a packet received in a previous transmitted request, in accordance with certain aspects of the present disclosure. The operations 1000 may begin, at 1002, by transmitting, to an apparatus, a first request to send at least one characteristic of a channel. For certain aspects, the apparatus may comprise a STA. In response to the transmitted first request, a packet may be received from the apparatus at 1004. At 1006, a second request to send the at least one characteristic of the channel may be transmitted. The second request may comprise an ACK indicating that the packet was received.

For certain aspects, the at least one characteristic of the channel may comprise CSI. In this case, the first and second requests may comprise CSI poll messages. The packet may comprise data about the at least one characteristic of the channel.

For certain aspects, the packet may comprise a sequence number, which may be generated by the apparatus. In this case, the second request may also comprise the sequence number. For certain aspects, a training frame may be transmitted before the first request is transmitted at 1002. The training frame may comprise the sequence number.

For certain aspects, in response to the transmitted second request, another packet (i.e., a second packet) may be received from the apparatus. The other packet may comprise updated data about the at least one characteristic of the channel.

Figure 11:
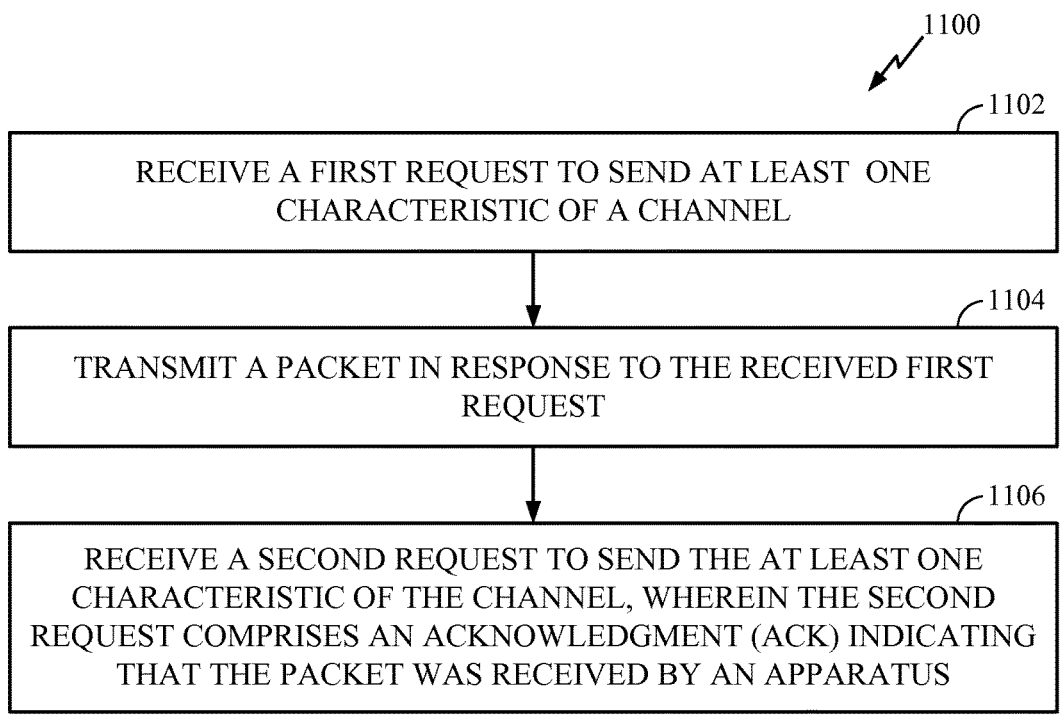
FIG. 11 illustrates example operations that may be performed at a STA to receive a request to send at least one characteristic of a channel accompanied by an ACK of a packet transmitted in a previously received request, in accordance with certain aspects of the present disclosure.
Figure 11A:
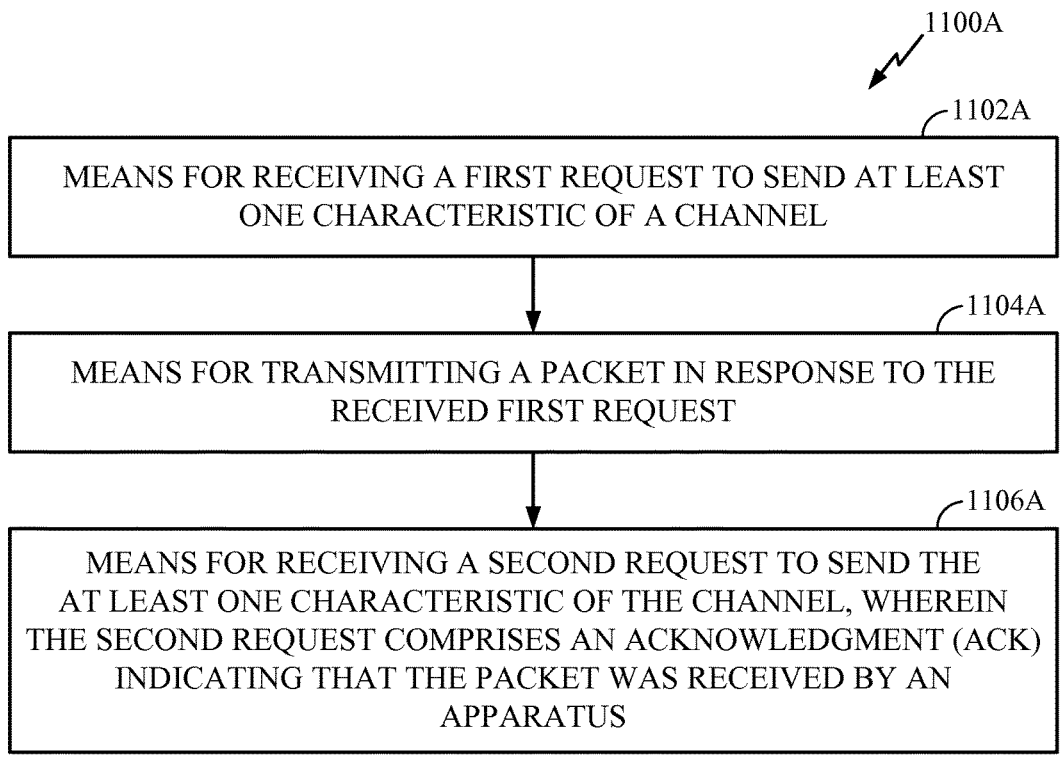
FIG. 11A illustrates example means capable of performing the operations shown in FIG. 11.

FIG. 11 illustrates example operations 1100 that may be performed at a STA to receive a request to send at least one characteristic of a channel accompanied by an ACK of a packet transmitted in a previously received request, in accordance with certain aspects of the present disclosure. The operations 1100 may begin, at 1102, by receiving a first request to send at least one characteristic of a channel. At 1104, a packet may be transmitted in response to the received first request. At 1106, a second request to send the at least one characteristic of the channel may be received. The second request may comprise an ACK indicating that the packet was received by an apparatus, such as an AP.

For certain aspects, the at least one characteristic of the channel may comprise CSI. In this case, the first and second requests may comprise CSI poll messages. The packet may comprise data about the at least one characteristic of the channel.

For certain aspects, the packet may comprise a sequence number, which may be generated by the STA. In this case, the second request may also comprise the sequence number. For certain aspects, a training frame may be received before the first request is received at 1102. The training frame may comprise the sequence number. The at least one characteristic of the channel may be determined based on the training frame.

For certain aspects, the at least one characteristic of the channel may be updated after transmitting the packet in response to the first request at 1104. In response to the second request, another packet (i.e., a second packet) may be transmitted. The other packet may comprise data about the updated at least one characteristic of the channel.

Figure 6A:
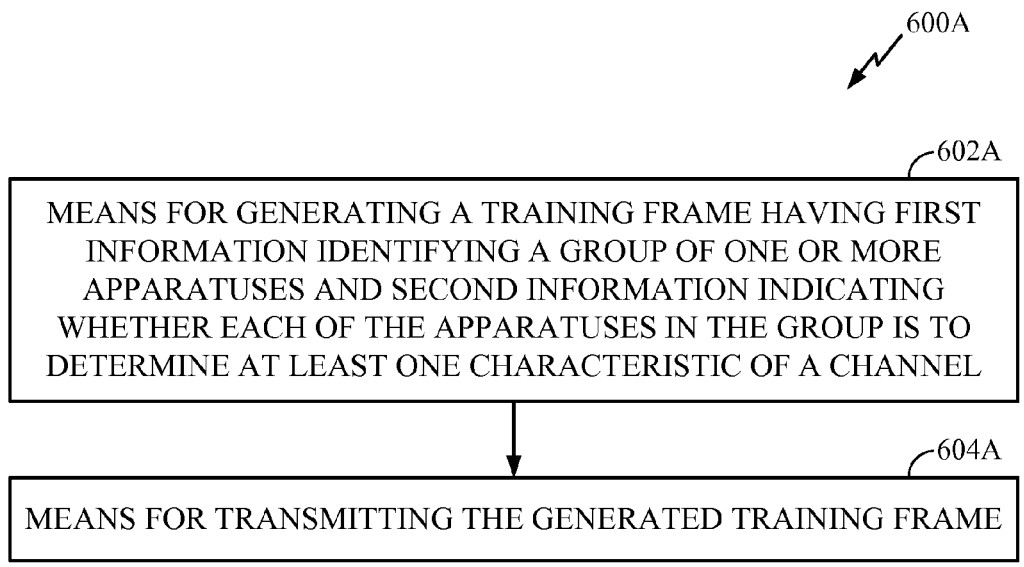
FIG. 6A illustrates example means capable of performing the operations shown in FIG. 6.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 600 illustrated in FIG. 6 correspond to means 600A illustrated in FIG. 6A.

For example, means for transmitting may comprise a transmitter (e.g., the transmitter unit 222) and/or an antenna 224 of the access point 110 or the transmitter unit 254 and/or antenna 252 of the user terminal 120 illustrated in FIG. 2. Means for receiving may comprise a receiver (e.g., the receiver unit 254) and/or an antenna 252 of the user terminal 120 or the receiver unit 222 and/or antenna 224 of the access point 110 illustrated in FIG. 2. Means for processing, means for determining, means for deciding, means for generating, or means for updating may comprise a processing system, which may include one or more processors, such as the RX data processor 270, the TX data processor 288, and/or the controller 280 of the user terminal 120 or the RX data processor 242, the TX data processor 210, and/or the controller 230 of the access point 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
   receiving, at an apparatus, a request;
   receiving a training frame including a sequence number;
   using the sequence number included in the training frame to determine at least one characteristic of a channel;
   generating a packet including the sequence number; and
   transmitting, after receiving the request, the packet, wherein two or more frames are transmitted in the packet using a single header, wherein the packet comprises data indicating the request was received and data indicating that a portion of the at least one characteristic of the channel will be provided in a subsequent packet.

2. The method of claim 1, wherein the at least one characteristic of the channel comprises channel state information (CSI).

3. The method of claim 1, wherein the frames comprise aggregated media access control (MAC) protocol data units (A-MPDUs) and wherein the A-MPDUs represent another portion of the at least one characteristic of the channel.

4. The method of claim 1, wherein the packet comprises the data indicating the request was received without providing, in the packet, any portion of the at least one characteristic of the channel.

5. The method of claim 1, wherein the data indicating the request was received comprises an acknowledgment (ACK) message.

6. The method of claim 1, wherein the packet comprises data representing another portion of at least one characteristic of the channel.

7. The method of claim 6, wherein the data representing the other portion of at least one characteristic of the channel comprises data to reconstruct the at least one characteristic of the channel from multiple aggregated media access control (MAC) protocol data units (A-MPDUs).

8. The method of claim 1, wherein the packet further comprises data about transmit and receive antenna indices.

9. An apparatus for wireless communications, comprising:
   a receiver configured to receive a request and a training frame including a sequence number;
   a processing system configured to use the sequence number included in the training frame to determine at least one characteristic of a channel and generate a packet including the sequence number; and
   a transmitter configured to transmit, after receiving the request, the packet, wherein two or more frames are transmitted in the packet using a single header, wherein the packet comprises data indicating the request was received and data indicating that a portion of the at least one characteristic of the channel will be provided in a subsequent packet.

10. The apparatus of claim 9, wherein the at least one characteristic of the channel comprises channel state information (CSI).

11. The apparatus of claim 9, wherein the frames comprise aggregated media access control (MAC) protocol data units (A-MPDUs) and wherein the A-MPDUs represent another portion of the at least one characteristic of the channel.

12. The apparatus of claim 9, wherein the packet comprises the data indicating the request was received without providing, in the packet, any portion of the at least one characteristic of the channel.

13. The apparatus of claim 9, wherein the data indicating the request was received comprises an acknowledgment (ACK) message.

14. The apparatus of claim 9, wherein the packet comprises data representing another portion of at least one characteristic of the channel.

15. The apparatus of claim 14, wherein the data representing the other portion of at least one characteristic of the channel comprises data to reconstruct the at least one characteristic of the channel from multiple aggregated media access control (MAC) protocol data units (A-MPDUs).

16. The apparatus of claim 9, wherein the packet further comprises data about transmit and receive antenna indices.

17. An apparatus for wireless communications, comprising:
   means for receiving a request;
   means for receiving a training frame including a sequence number;
   means for determining at least one characteristic of a channel based on the sequence number included in the training frame;
   means for generating a packet, wherein the packet comprises the sequence number included in the training frame;
   means for transmitting, after receiving the request, the packet, wherein two or more frames are transmitted in the packet using a single header, wherein the packet comprises data indicating the request was received and data indicating that a portion of the at least one characteristic of the channel will be provided in a subsequent packet.

18. The apparatus of claim 17, wherein the at least one characteristic of the channel comprises channel state information (CSI).

19. The apparatus of claim 17, wherein the frames comprise aggregated media access control (MAC) protocol data units (A-MPDUs) and wherein the A-MPDUs represent another portion of the at least one characteristic of the channel.

20. The apparatus of claim 17, wherein the packet comprises the data indicating the request was received without providing, in the packet, any portion of the at least one characteristic of the channel.

21. The apparatus of claim 17, wherein the data indicating the request was received comprises an acknowledgment (ACK) message.

22. The apparatus of claim 17, wherein the packet comprises data representing another portion of at least one characteristic of the channel.

23. The apparatus of claim 22, wherein the data representing the other portion of at least one characteristic of the channel comprises data to reconstruct the at least one characteristic of the channel from multiple aggregated media access control (MAC) protocol data units (A-MPDUs).

24. The apparatus of claim 17, wherein the packet comprises data about transmit and receive antenna indices.

25. A non-transitory computer-readable medium comprising instructions executable to:
receive, at an apparatus, a request;
receive a training frame including a sequence number;
determine at least one characteristic of a channel based on the sequence number included in the training frame;
generate a packet, wherein the packet comprises the sequence number included in the training frame; and
transmit, after receiving the request, the packet, wherein two or more frames are transmitted in the packet using a single header, wherein the packet comprises data indicating the request was received and data indicating that a portion of the at least one characteristic of the channel will be provided in a subsequent packet.

26. A wireless node, comprising:
at least one antenna;
a receiver configured to receive, via the at least one antenna, a request and a training frame including a sequence number;
a processing system configured to use the sequence number included in the training frame to determine at least one characteristic of a channel and generate a packet including the sequence number; and
a transmitter configured to transmit, after receiving the request, the packet, wherein two or more frames are transmitted in the packet using a single header, wherein the packet comprises data indicating the request was received and data indicating that a portion of the at least one characteristic of the channel will be provided in a subsequent packet.

27. A method for wireless communications, comprising:
transmitting a training frame, wherein the training frame comprises a sequence number;
transmitting, to an apparatus, a first request to send at least one characteristic of a channel;
receiving after transmitting the first request, a packet from the apparatus, wherein the packet comprises the sequence number; and
transmitting, to the apparatus, a second request to send the at least one characteristic of the channel after receiving the packet, wherein the second request comprises an acknowledgment (ACK) indicating that the packet was received.

28. The method of claim 27, wherein the at least one characteristic of the channel comprises channel state information (CSI).

29. The method of claim 28, wherein the first and second requests comprise CSI poll messages.

30. The method of claim 27, wherein the second request comprises the sequence number.

31. The method of claim 27, further comprising receiving, after transmitting the second request, another packet from the apparatus, wherein the packet further comprises data about the at least one characteristic of the channel and wherein the other packet comprises updated data about the at least one characteristic of the channel.

32. An apparatus for wireless communications, comprising:
a transmitter configured to transmit, to another apparatus, a training frame and a first request to send at least one characteristic of a channel, wherein the training frame comprises a sequence number; and
a receiver configured to receive, after transmitting the first request, a packet from the other apparatus, wherein the packet comprises the sequence number, wherein the transmitter is configured to transmit, to the other apparatus, a second request to send the at least one characteristic of the channel after receiving the packet, and wherein the second request comprises an acknowledgment (ACK) indicating that the packet was received.

33. The apparatus of claim 32, wherein the at least one characteristic of the channel comprises channel state information (CSI).

34. The apparatus of claim 33, wherein the first and second requests comprise CSI poll messages.

35. The apparatus of claim 32, wherein the second request comprises the sequence number.

36. The apparatus of claim 32, wherein the packet further comprises data about the at least one characteristic of the channel and wherein the receiver is configured to receive, after transmitting the second request, another packet from the other apparatus comprising updated data about the at least one characteristic of the channel.

37. An apparatus for wireless communications, comprising:
means for transmitting, to another apparatus, a training frame, wherein the training frame comprises a sequence number;
means for transmitting a first request to send at least one characteristic of a channel; and
means for receiving, after transmitting the first request, a packet from the other apparatus, wherein the packet comprises the sequence number, wherein the means for transmitting is configured to transmit, to the other apparatus, a second request to send the at least one characteristic of the channel after receiving the packet, and wherein the second request comprises an acknowledgment (ACK) indicating that the packet was received.

38. The apparatus of claim 37, wherein the at least one characteristic of the channel comprises channel state information (CSI).

39. The apparatus of claim 38, wherein the first and second requests comprise CSI poll messages.

40. The apparatus of claim 37, wherein the second request comprises the sequence number.

41. The apparatus of claim 37, wherein the packet further comprises data about the at least one characteristic of the channel and wherein the means for receiving is configured to receive, after transmitting the second request, another packet from the other apparatus comprising updated data about the at least one characteristic of the channel.

42. A non-transitory computer-readable medium comprising instructions executable to:
transmit a training frame, wherein the training frame comprises a sequence number;
transmit, to an apparatus, a first request to send at least one characteristic of a channel;
receive, after transmitting the first request, a packet from the apparatus, wherein the packet comprises the sequence number; and
transmit, to the apparatus, a second request to send the at least one characteristic of the channel after receiving the packet, wherein the second request comprises an acknowledgment (ACK) indicating that the packet was received.

43. An access point, comprising:
at least one antenna;
a transmitter configured to transmit, to an apparatus via the at least one antenna, a training frame, wherein the training frame comprises a sequence number, and a first request to send at least one characteristic of a channel; and
a receiver configured to receive, after transmitting the first request, a packet from the apparatus, wherein the packet comprises the sequence number, wherein the transmitter is configured to transmit, to the apparatus, a second request to send the at least one characteristic of the channel after receiving the packet comprising the sequence number, and wherein the second request comprises an acknowledgment (ACK) indicating that the packet was received.

44. A method for wireless communications, comprising:
receiving a training frame, wherein the training frame comprises a sequence number;
receiving a first request to send at least one characteristic of a channel;
determining the at least one characteristic of the channel based on the training frame;
transmitting a packet after reception of the first request, wherein the packet comprises the sequence number;
receiving a second request to send the at least one characteristic of the channel, wherein the second request comprises an acknowledgment (ACK) indicating that the packet was received by an apparatus; and
transmitting, after receiving the second request, the at least one characteristic of the channel.

45. The method of claim 44, wherein the at least one characteristic of the channel comprises channel state information (CSI).

46. The method of claim 45, wherein the first and second requests comprise CSI poll messages.

47. The method of claim 44, wherein the second request comprises the sequence number.

48. The method of claim 44, further comprising:
updating the at least one characteristic of the channel after transmitting the packet in response to the first request, wherein the packet comprises data about the at least one characteristic of the channel; and
transmitting, in response to the second request, another packet comprising data about the updated at least one characteristic of the channel.

49. An apparatus for wireless communications, comprising:
a receiver configured to receive a training frame, wherein the training frame comprises a sequence number, and a first request to send at least one characteristic of a channel;
a transmitter configured to transmit a packet after reception of the first request, wherein the packet comprises the sequence number, wherein the receiver is configured to receive a second request to send the at least one characteristic of the channel and wherein the second request comprises an acknowledgment (ACK) indicating that the packet was received by another apparatus; and
a processing system, configured to determine the at least one characteristic of the channel based on the training frame, wherein the transmitter is configured to transmit the at least one characteristic of the channel after receiving the second request.

50. The apparatus of claim 49, wherein the at least one characteristic of the channel comprises channel state information (CSI).

51. The apparatus of claim 50, wherein the first and second requests comprise CSI poll messages.

52. The apparatus of claim 49, wherein the second request comprises the sequence number.

53. The apparatus of claim 49, wherein the packet comprises data about the at least one characteristic of the channel, wherein the processing system is configured to update the at least one characteristic of the channel after the transmitter transmits the packet in response to the first request, and wherein the transmitter is configured to transmit, in response to the second request, another packet comprising data about the updated at least one characteristic of the channel.

54. An apparatus for wireless communications, comprising:
means for receiving a training frame, wherein the training frame comprises a sequence number, and a first request to send at least one characteristic of a channel;
means for transmitting a packet after receiving the first request, wherein the packet comprises the sequence number, wherein the means for receiving is configured to receive a second request to send the at least one characteristic of the channel and wherein the second request comprises an acknowledgment (ACK) indicating that the packet was received by another apparatus; and
means for determining the at least one characteristic of the channel based on the training frame, wherein the means for transmitting is configured to transmit the at least one characteristic of the channel after receiving the second request.

55. The apparatus of claim 54, wherein the at least one characteristic of the channel comprises channel state information (CSI).

56. The apparatus of claim 55, wherein the first and second requests comprise CSI poll messages.

57. The apparatus of claim 54, wherein the second request comprises the sequence number.

58. The apparatus of claim 54, further comprising means for updating the at least one characteristic of the channel after transmitting the packet in response to the first request, wherein the packet comprises data about the at least one characteristic of the channel, and wherein the means for transmitting is configured to transmit, in response to the second request, another packet comprising data about the updated at least one characteristic of the channel.

59. A non-transitory computer-readable medium comprising instructions executable to:
receive a training frame, wherein the training frame comprises a sequence number;
receive a first request to send at least one characteristic of a channel;
transmit a packet after receiving the first request, wherein the packet comprises the sequence number;
receive a second request to send the at least one characteristic of the channel, wherein the second request comprises an acknowledgment (ACK) indicating that the packet was received by an apparatus;
determining the at least one characteristic of the channel based on the training frame; and
transmit the at least one characteristic of the channel after receiving the second request.

60. A wireless node, comprising:
at least one antenna;
a receiver configured to receive, via the at least one antenna, a training frame, wherein the training frame comprises a sequence number, and a first request to send at least one characteristic of a channel; and
a transmitter configured to transmit a packet after receiving the first request, wherein the packet comprises the sequence number, wherein the receiver is configured to receive a second request to send the at least one characteristic of the channel, and wherein the second request comprises an acknowledgment (ACK) indicating that the packet was received by an apparatus; and
a processing system configured to determine the at least one characteristic of the channel based on the training frame, wherein the transmitter is configured to transmit the at least one characteristic of the channel after receiving the second request.

* * * * *